Figures 8, 9:
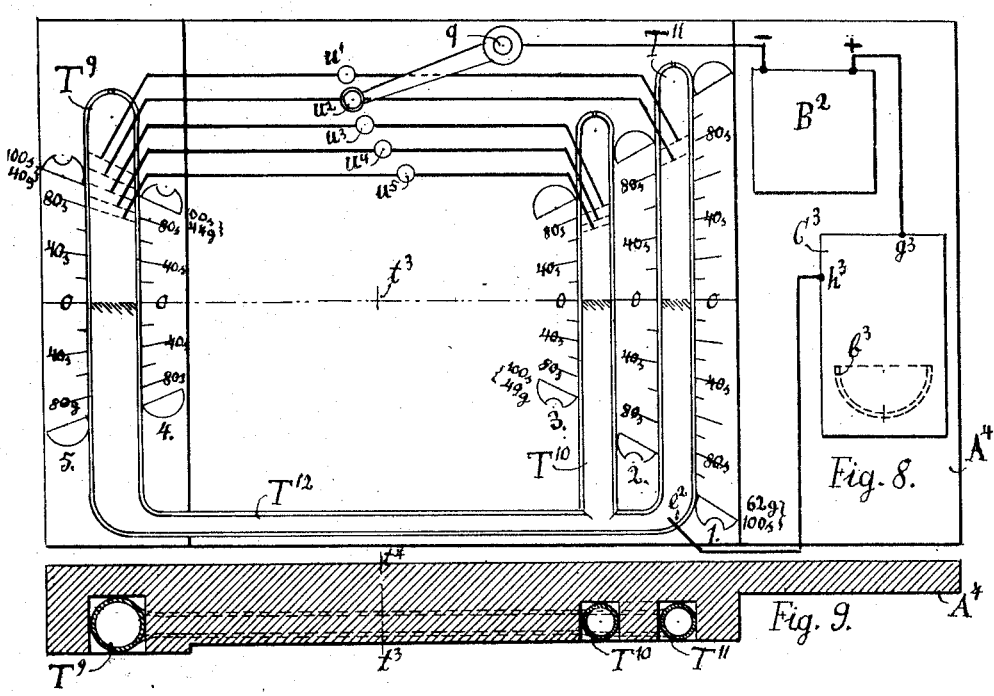

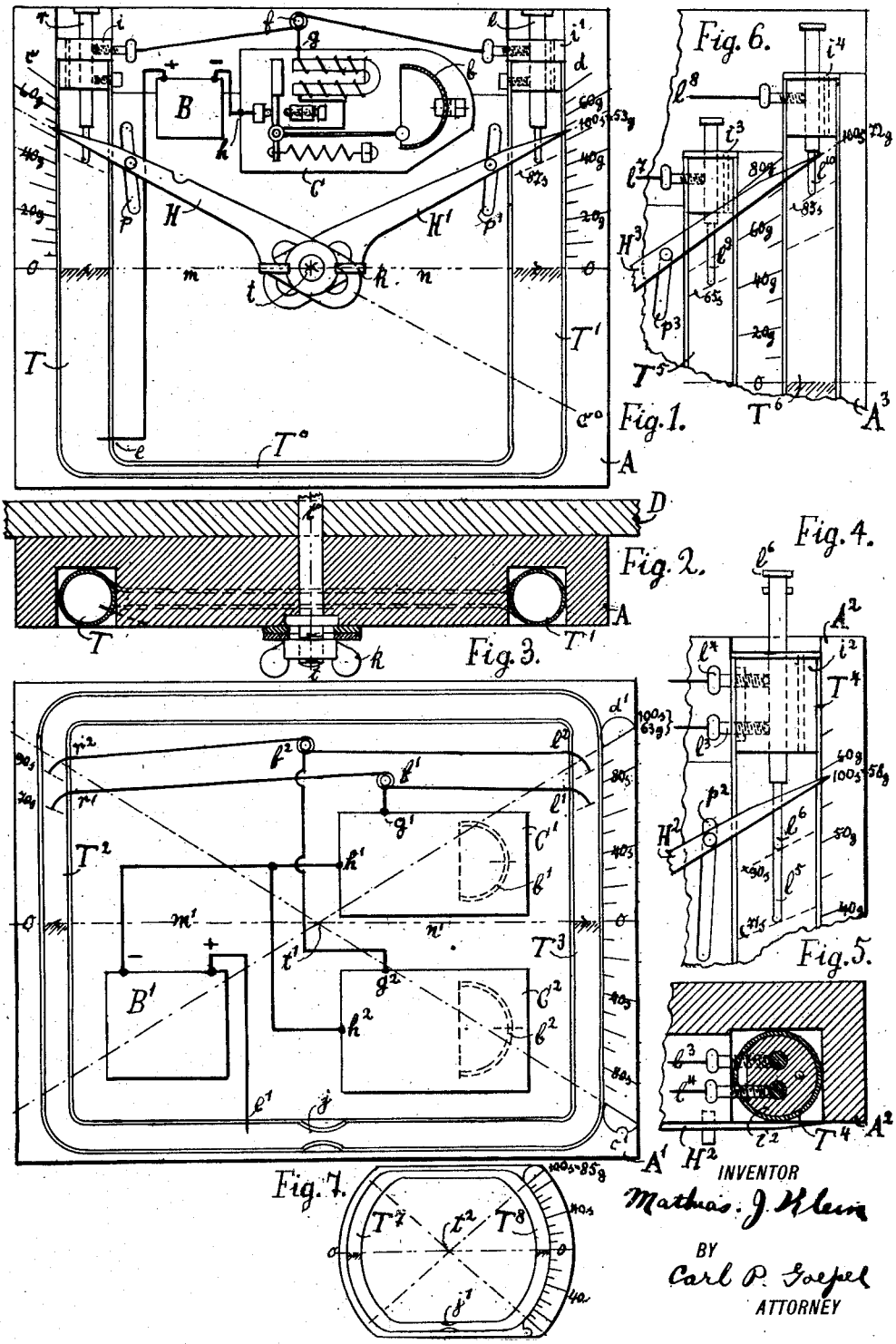

UNITED STATES PATENT OFFICE.

MATHIAS J. KLEIN, OF NEW YORK, N. Y., ASSIGNOR OF SIXTY ONE-HUNDREDTHS TO HUGO B. ROELKER, OF NEW YORK, N. Y.

SIDE-FORCE AND DANGER INDICATOR.

1,370,320.

Specification of Letters Patent.

Patented Mar. 1, 1921.

Application filed October 24, 1916, Serial No. 127,340. Renewed July 28, 1920. Serial No. 399,624.

*To all whom it may concern:*

Be it known that I, MATHIAS J. KLEIN, a citizen of the United States, and resident of New York, in the borough of Manhattan, in the county and State of New York, have invented certain new and useful Improvements in Side-Force and Danger Indicators, of which the following is a specification.

This invention relates to indicators to be used on motor vehicles, automobiles and other vehicles, having three or more road wheels; its object being to show, in the first place, the danger to the vehicle of being turned over when the latter is moving in a curve at a more or less high speed, and secondly, to show the so-called "side-force" acting sidewise on the vehicle, to the right or to the left.

The device described in this specification is of nature similar to that, described in my former application, "Side-force and danger indicators, Ser. No. 834,114, filed April 24, 1914;" allowed Sept. 14, 1917, and renewed March 22, 1918, Ser. No. 224,051, Patent 1,309,574, issued July 8, 1919.

The invention consists of straight or curved communicating glass tubes, (the latter at their lower ends being usually connected by one glass tube common to all), with a liquid oscillating in said tubes, and connected to a base plate, the latter having a dial on which are always two so called "danger-marks" (or "danger-hands," sometimes called "low danger-marks" or hands), which have fixed or variable positions on the dial; one of them acting for right hand turns, and the other for left hand turns of the vehicle; (if there are more than two danger-marks on the dial, two of them are only acting at a certain time, corresponding to a certain load of the vehicle); one or two "electric alarm bells" are also connected to the arrangement. The positions of the two acting danger-marks or hands on said dial, have a fixed relation to the position of the center of gravity of the vehicle carrying a certain load.

Said dial may be without a scale or pair of scales, but usually it is provided with one pair (or more pairs) of scales and the latter may be non-variable (constant) or variable scales (so-called "side-force scales"); the liquid level of the oscillating liquid in the communicating glass tubes oscillating always around a fixed center of the indicator and acting as an index-hand, and showing on said pairs of scales, the side-force acting on the vehicle, and when either of said acting danger-marks (or hands) is reached by said liquid level, the vehicle is turned over by said side-force to the right or to the left hand side. If therefore, (vehicle moving in any curve on a level or banked road), the liquid level (as index-hand) comes more or less near to one of said two acting danger-marks (or hands), the vehicle is more or less in danger of being turned over. The acting danger-marks (or hands) change their positions on the dial usually with the load of the vehicle. The variable side-force scales show the side-force directly, and the non-variable (constant) scales indirectly, no scales on the dial would only show the turn over danger of the vehicle, but the side-force of course could be roughly estimated, as the index-head (liquid level) changes its position between the zero-point and one of the acting danger-marks. Said alarm bell or bells commence to ring before the turn over danger is reached by the turning vehicle.

The definition of "center line," of "side normal," of "side-force angle," of "turn over angle," of "turn over side-force," of "tangent of side-force angle," of "tangent of turn over angle" and "its value," is the same as in my former application above mentioned. The side-force (acting always on the center of gravity of the loaded or unloaded vehicle, in the direction of said side normal), is shown by the index-hand (liquid level) of the indicator on a side-force scale of the dial, in percentage of the turn over side-force (not its absolute value) and said side-force increases in the same proportion as the tangent of the side-force angle increases. The danger-marks (or hands) on the dial (corresponding to the turn over angle of the liquid level), represent always the 100% ($100_s$) side-force (the turn over side-force of the vehicle), and are marked with $100_s$, but may be marked in some other way; if the liquid level (as index-hand) reaches, for instance, the $20_s$ mark (or hand) of a side-force scale, when the vehicle is turning in a curve, a side-force of $20_s$ or 20% (that is 20/100 or 1/5 of the turn over side-force) is shown. 100 times the tangent of the turn over angle, would give the position of the corresponding danger-mark (or hand) on a non-variable grade scale; this is the fixed relation between the position of the danger-marks (or hands) on the dial, and the position of the center of gravity of the loaded or unloaded vehicle. If the vehicle stands (or moves straight) on a level road, the index-hand (liquid level) of the indicator must point to the zero-mark of the dial (showing a side-force of 0%). The line of said zero-point (or mark) to the turning axis of the liquid level, is the so-called zero-line of the dial, which has always a horizontal position, when the vehicle is standing on a level road. On one scale of each pair of scales, is shown the side-force for right hand turns, and on the other scale of said pair of scales, is shown the side-force for left hand turns of the vehicle; said indicator is therefore a "double acting indicator."

If only one electric alarm bell is connected to the indicator, it commences to ring when the lower limit of the so-called "danger zone" is reached by the side-force acting on the turning vehicle; the upper limit of said danger zone is always at $100_s$ side-force (the turn over side-force), while its lower limit may be at $75_s$, or at $80_s$, or even at $90_s$ side-force, said lower limit of the danger zone may be placed at a fixed side-force, for instance at $85_s$, or it may be changeable (between $75_s$ and $90_s$ side-force), according to indicator construction. If two alarm bells (of different sounds) are used on the indicator arrangement, the first alarm of one bell is given before the lower limit of the danger zone is reached (for instance at $60_s$ or at $65_s$ side-force), and the second alarm (when both bells are ringing) is given, when the lower limit of the danger zone (say $80_s$ or $85_s$ side-force) is reached.

In the foregoing, the two acting danger-marks (or hands) are placed usually at $100_s$ side-force, but they may be placed at a lower mark than $100_s$, for instance, at $90_s$ (or $85_s$) side-force (which is or may be called the lower limit of the danger zone); in that case, the tangent of the corresponding side-force angle (corresponding to $90_s$) is only 90/100 or 9/10 of the tangent of side-force angle (called turn over angle), which corresponds to $100_s$ side-force. In such case, I call said marks (or hands) "low danger-marks" or "low danger-hands". Now the turning vehicle will not turn over when one of the two acting "low danger-marks" (or hands) is reached by the index-hand that is at $90_s$ (or $85_s$) side-force, but the danger of turn over of the vehicle is not far away.

Should a more or less strong wind power act on one side of the turning vehicle, the turn over side-force is not at $100_s$ side-force, but somewhat higher or lower than $100_s$.

Said double acting indicator must be mounted on a four wheeled vehicle (the latter standing on a level road), in such a way that the oscillation or turning axis of the liquid level is parallel and near to the center line of the vehicle and its liquid level (as index-hand) points to the zero-point, otherwise its place on the vehicle is optional; it is usually placed on the dashboard of the motor vehicle in front of the vehicle driver.

On a four wheeled vehicle said indicator always gives correct indications when the vehicle is turning on a level or banked road, but on a three wheeled vehicle the indications of said double acting indicator are only nearly correct.

In the accompanying drawing, Figure 1 is a front view, and Fig. 2 a horizontal section of a double acting side-force and danger indicator, with one electric alarm bell and a pair of (constant) grade scales on its dial.—Fig. 3 is a front view of a double acting indicator, having two electric alarm bells and a pair of side-force scales on its dial, for a vehicle, carrying always the same load.—Fig. 4 is a front view, and Fig. 5 a horizontal section of the upper part of the right hand glass tube of an indicator, with a pair of grade scales, having two alarms for variable loads of the vehicle.—Fig. 6 shows a modification of the same part of an indicator.—Fig. 7 is a front view of a double acting indicator with two circular curved communicating glass tubes, having a pair of side-force scales on its dial, and one alarm bell; the latter is similarly connected to the glass tubes as shown in Figs. 1 or 3.—Fig. 8 is a front view, and Fig. 9 a horizontal section of a double acting indicator, with one alarm bell and a plurality of pairs of side-force scales on its dial, corresponding to a plurality of different loads of the vehicle.

The oscillating liquid in the communicating glass tubes is a non-freezing liquid, and a somewhat good conductor of electricity, as for instance, mercury, or a solution of water with a certain percentage (20% to 30%) of sulfuric acid.

Similar letters of reference indicate corresponding parts in all figures.

In the indicator arrangement shown in the Figs. 1 and 2, the two straight vertical glass tubes T and $T^1$ of the same or of different size, are connected at their lower ends by the thin glass tube $T^0$, they are filled up to the horizontal level (the zero line of the indicator) with said non-freezing liquid, and connected to the base plate A, (the latter is connected to the dashboard D of a motor vehicle); said base-plate having a dial with a non-variable pair of grade scales Oc and Od, Oc acting for right hand turns, and Od for left hand turns of the vehicle. The electric battery B (of any construction), and the alarm arrangement in box C (with bell b) are connected to the upper part of base plate A, (but they may have any other location on the vehicle). The liquid in the glass tubes T, T⁰, T¹, oscillates around the horizontal axis $t$, $t^0$; the two danger hands H and H¹ are usually so adjusted that they show always the $100_s$ (100%) side-force, (the turn over side-force) when reached by the oscillating liquid level in the tubes; on said pair of grade-scales, the side-force is shown indirectly. The two pins of the danger-hands H and H¹ move in the slots $p$ and $p^1$ of base-plate A respectively, and thereby the indicating ends of H and H¹ move vertically up and down on said pair of vertical grade scales; the hand screw $k$ keeps said danger-hands H and H¹ in fixed positions. The caps $i$ and $i^1$ of the glass tubes T and T¹ having each an adjustable vertical rod $r$ and $l$ respectively, which are raised or lowered according to the lower limit of the danger zone for a certain load of the vehicle; small holes in said caps allow air to go in and out of said glass tubes when the liquid is oscillating in the tubes T, T⁰ and T¹. A wire from the positive pole of battery B enters at $e$ the lower end of the glass tube T, and is there constantly in touch with said oscillating liquid; if now the vehicle moves in a curve (on a level or banked road), and the side-force acting on the vehicle is raised to the lower limit of the danger zone, the liquid level touches the lower end of rod $r$ by a right hand turn, and the lower end of rod $l$ by a left hand turn of the vehicle; now the electric current passes from the positive pole of battery B to $e$ in the liquid, and then (by a right hand turn) to rod $r$ and wire to $f$, or (by a left hand turn) to rod $l$ and wire to $f$; from here the current enters the alarm box C at $g$, goes through the windings of a small electro-magnet to $h$ and then to the negative pole of battery B; now the anchor of said electro-magnet is attracted, a hammer strikes on bell $b$ and thereby the current is interrupted, a spring throws the anchor back and closes the circuit again; in this way the bell $b$ of the alarm box C is ringing as long as one of the rods $r$ or $l$ is in touch with said liquid. If the tangent of the turn over angle is, for instance, 0.53, for a certain load of the vehicle (for right and left hand turns), the danger-hands H and H¹ are set each to $53_g$ of said grade scales by means of hand screw $k$, $53_g$ represents now $100_s$ side-force; if the danger zone should be between $87_s$ and $100_s$ side-force, then the rods $r$ and $l$ are set each to $87/100 \times 53 = 46_g$; if now the side-force of the turning vehicle goes up to $87_s$ ($46_g$) or higher, said alarm bell $b$ rings. If the vertical glass tubes T and T¹ have the same size, $m$ is equal to $n$, and if T has a larger diameter than T¹, $n$ is larger than $m$.

If the danger hand H would be turned 180° to the position $t$ C⁰, and the grade scale O$c$ (on the left of tube T) removed to O$c^0$ (on the right of tube T¹), it would represent a modification of the arrangement shown in Figs. 1 and 2, and work exactly in same way as before described, of course a small part of the upper end of grade scale O$c$ must remain in order to adjust the rod $r$ for different loads of the vehicle.

The straight vertical glass tubes T² and T³ of the indicator shown in Fig. 3, having their upper and lower ends connected by horizontal glass tubes, all four tubes may have the same size, or they may have different sizes, the lower horizontal tube is by $j$ reduced in size; said communicating tubes T² and T³ are filled with a liquid up to the horizontal level O $t^1$ O (the zero line of the indicator), and connected to the base plate A¹, the latter is connected to the dash board of a motor vehicle; to said base plate are also connected the electric battery B¹ and the two alarm boxes C¹ and C² with the bells $b^1$ and $b^2$ respectively, the latter are of different sounds. The dial $c^1$ $d^1$ on base plate A¹ (on the right of tube T³) is provided with a pair of side-force scales O$c^1$ and O$d^1$, on which are shown the side-forces directly for right and left hand turns of the vehicle corresponding to a certain load, the level of the oscillating liquid in the tubes oscillates around $t^1$. If the tangent of the turn over angle of said load is, for instance, 0.63 (for right and left hand turns), the two danger-marks $100_s$ must be placed each at $63_g$ of a grade scale. Said indicator is so arranged, that the first alarm is given at $70_s$ and the second alarm at $90_s$ side-force. From the point $f^1$ on base-plate A¹, are branching off the three wires $f^1$ $g^1$, $f^1$ $r^1$ and $f^1$ $l^1$, and from the point $f^2$ on base-plate A¹ are branching off the three wires $f^2$ $g^2$, $f^2$ $r^2$ and $f^2$ $l^2$; at the four fixed points $r^1$, $l^1$ and $r^2$, $l^2$ of the glass tubes T² and T³, the four wires $f^1$ $r^1$, $f^1$ $l^1$ and $f^2$ $r^2$, $f^2$ $l^2$ enter inside of said tubes and coming there in touch with said oscillating liquid, when side-forces of $70_s$ respective $90_s$ are reached by the turning vehicle. The two alarm boxes C¹ and C² have the same construction as the alarm box C of Fig. 1, and are connected with the battery current in parallel. From the positive pole of battery B¹ (Fig. 3), a wire enters at $e^1$ the lower horizontal glass tube, and is there at all times in touch with the oscillating liquid; the points $h^1$ and $h^2$ of the alarm boxes C¹ and C² are connected by wires with the negative pole of battery B¹. If the turning vehicle reaches a side-force of $70_s$, the bell $b^1$ (of box C¹) commences to ring, the first alarm is given, and if said side-force reaches $90_s$ (the lower limit of the danger zone), the second alarm is given, both bells $b^1$ and $b^2$ are now ringing (as is easy to see from the arrangement shown), and the vehicle driver is thereby informed that it is dangerous to increase the side-force of the turning vehicle much more.

If the two hammers of the alarm boxes $C^1$ and $C^2$ would strike at the second alarm the same bell (say bell $b^1$, and letting bell $b^2$ away), said second alarm would usually also be different from the first alarm, but in case each stroke of the two hammers would take place exactly at the same time, said second alarm (the most important one) might be misunderstood to be only the first alarm, therefore, it is advisable with two alarms, to use two bells of different sounds.

While the indicator shown in Fig. 3 gives two alarms for a fixed load of the vehicle, the indicator shown in Figs. 4 and 5 (partly only), gives also two alarms, but for variable loads of the vehicle. The cap $i^2$ in the straight vertical glass tube $T^4$ is a non-conductor of electricity (like ivory), it carries the two adjustable rods $l^5$ and $l^6$, which are kept in position by the screws $l^3$ and $l^4$ respectively; said rods are so adjusted that (by a left hand turn of the vehicle), $l^5$ comes in touch with the oscillating liquid in glass tube $T^4$, when the first alarm is to be given (say at $71_s$ side-force), and one bell rings, that $l^6$ comes also in touch with the oscillating liquid, when the lower limit of the danger zone (say $90_s$) is reached, and both alarm bells are ringing. The upper part of the left hand straight vertical glass tube of the indicator (not shown), is in the same way arranged for right hand turns of the vehicle. The glass tubes of the indicator are connected to base-plate $A^2$, the dial on the latter is provided with a pair of non-variable grade scales. The wire connections of the electric battery with the two alarm bells (not shown), is the same as shown in Fig. 3.

In the modification shown in Fig. 6, (of the indicator arrangement shown partly in Figs. 4 and 5), two straight vertical glass tubes $T^5$ and $T^6$ on the right are communicating with two similar constructed glass tubes on the left, (instead of one tube on each side), they are connected to base-plate $A^3$. The two caps $l^3$ and $l^4$ (which may be conductors or non-conductors of electricity), carry the two adjustable rods $l^9$ and $l^{10}$, respectively, which are kept in position, $l^9$ by screw $l^7$, and $l^{10}$ by screw $l^8$; when the oscillating liquid in glass tube $T^5$ (by a left hand turn of the vehicle) touches the rod $l^9$ (say at $65_s$), the first alarm (one bell ringing) is given, and when said oscillating liquid touches rod $l^{10}$ in tube $T^6$ (say at $83_s$), the second alarm (two bells are ringing) is given, indicating, that the side-force of the lower limit of the danger zone is reached by the turning vehicle. The dial on base-plate $A^3$ is also provided with a pair of non-variable grade scales, on which the side-force acting on the turning vehicle is shown indirectly. Instead of two straight vertical glass tubes on each side of said double acting indicator, more than two tubes might be used on each side, and in the indicator arrangement shown in Figs. 1 and 2, also more than one straight vertical glass tube might be used on each side of the indicator. The slots $p^2$ and $p^3$ in the Figs. 4 and 6, have the same purpose as the slots $p$ and $p^1$ in Fig. 1.

In the indicator arrangement shown in Figs. 8 and 9 with one alarm bell, the straight vertical glass tube $T^9$ (on the left) is communicating with the two straight vertical glass tubes $T^{10}$ and $T^{11}$ (on the right) by means of the horizontal glass tube $T^{12}$, they are filled with a liquid up to the horizontal level $Ot^3O$ (the zero-line of the indicator), and connected to the base plate $A^4$; the liquid level of the oscillating liquid in the tubes oscillates around the horizontal axis $t^3 t^4$. On said base plate are five pairs of side-force scales No. 1, 2, 3, 4, 5, corresponding to five different loads of the vehicle. From the five points $u^1, u^2, u^3, u^4$ and $u^5$, on said base plate $A^4$, five pairs of wires branching off, five wires go to the right and five to the left, the latter five wires enter at fixed places inside of the glass tube $T^9$, and three, respective two, (of the other five wires going to the right) enter at fixed places inside of the glass tubes $T^{10}$ and $T^{11}$; each end of said wires comes in touch with the oscillating liquid level in said communicating tubes, when the lower limit of the danger zone (say $83_s$) is reached by the side-forces corresponding to the five different loads of the vehicle for right and left hand turns. A switch lever turning around $q$ on base plate $A^4$, brings any pair of said five pairs of wire branches in connection with $q$, and thereby with the negative pole of battery $B^2$, the latter and the alarm box $C^3$ (with bell $b^3$) are also connected to said base plate $A^4$. The positive pole of said battery is connected with $g^3$ of said alarm box $C^3$, the electric current leaves at $h^3$ said box, a wire connecting $h^3$ with $e^2$, and entering there inside of glass tube $T^{11}$, is constantly in touch with the oscillating liquid in said tubes. If now the vehicle carries load No. 2, said switch lever is shifted to $u^2$, and the side-force acting on the turning vehicle is shown directly on the pair of side-force scales No. 2, and whenever said side-force, by a right or left hand turn of the vehicle, reaches $83_s$ (the lower limit of the danger zone), the bell $b^3$ in alarm box $C^3$ rings; the arrangement works in the same way by the other four loads of the vehicle. The danger marks ($100_s$ for right and left hand turns of the vehicle) of the five different vehicle loads, corresponding relatively to: $62_g, 55_g, 49_g, 44_g$ and $40_g$, of a non-variable grade scale.

The indicator shown in Fig. 3 (with two alarms) may have its communicating tubes T² and T³ curved like the arrangement shown in Fig. 7 (with one alarm bell), where the circular curved communicating glass tubes T⁷ and T⁸ are connected above and below by horizontal glass tubes, the lower one is reduced in size by $j^1$, they are connected to a base plate and filled with a liquid up to the horizontal level O $t^2$O (the zero-line of the indicator), the oscillating liquid level turns around $t^2$ which is the center of the glass tube circles of T⁷ and T⁸, said tubes may have the same or different sizes, if T⁸ is thinner than tube T⁷ the latter is nearer to $t^2$ than T⁸. The dial on the base-plate of the double acting indicator, is provided with a pair of side-force scales for one load of the vehicle; the scale divisions of said scales are decreasing in size from zero up to the danger-marks, while the scale divisions of all scales (side-force scales as well as non-variable grade scales) are constant, when the indicator has straight vertical communicating glass tubes (one on each side or more than one on each side of the indicator). The indicator arrangements shown in Figs. 3 and 7, may also have (a plurality of) four pairs of side-force scales on the dial, corresponding to four different loads of the vehicle.

The indicator shown in Figs. 8 and 9, with one alarm on the lower limit of the danger zone for a plurality of different vehicle loads, may have instead of straight vertical communicating glass tubes, circular curved communicating glass tubes, like the arrangement shown in Fig. 7, or in a similar way arranged.

In order to bring the oscillations of the liquid level in the communicating glass tubes quickly to rest, different methods are used. On the indicator shown in the Figs. 1 and 2, a thin glass tube T⁰ is used for connecting the straight vertical communicating tubes; in the Figs. 3 and 7, the lower connecting tubes are reduced in size by $j$ and $j^1$ respectively, and in Fig. 8, small holes on top of the straight vertical glass tubes T⁹, T¹⁰ and T¹¹ are used. A small stop valve in the lower (or upper) connecting tube may also be used for the same purpose.

In the foregoing, the turn over angles for right and left hand turns, are described to be of the same size, but they may have different sizes.

A vehicle moving straight on a banked road, shows also a side-force, in that case said side-force when shown on a grade scale, represents the banking grade of the road.

When a strong wind acts on the right hand side of the vehicle by a right hand turn, or on the left hand side by a left hand turn of the vehicle, the turn over of the latter will occur, before the side-force reaches one of the 100ₛ marks (or danger-marks); but a strong wind acting on the left by a right hand turn, or on the right by a left hand turn, raises the turn over of the vehicle more or less over the 100ₛ marks of side-force scales, and in such case, the vehicle driver may raise the side-force to one of the 100ₛ marks (danger-marks or hands) or even higher than 100ₛ, without risking a turn over of the vehicle.

In the electric alarm arrangements shown, an electric battery is used in each case to supply the current, instead, thereof, an equivalent arrangement may be used, for instance, a small dynamo (driven by the motor of the vehicle) may be employed; said current could also be used for other purposes, for producing the electric light of the vehicle, etc. Said communicating glass tubes are usually connected at their lower ends by one glass tube, but more than one tube may be used for the same purpose.

I do not limit myself to the constructions shown in the drawing; equivalent constructions may be used instead thereof.

Having thus described my invention, I claim as new, and desire to secure by Letters Patent:

1. In a double acting side-force and danger indicator for vehicles, the combination of a base-plate, two or more straight communicating glass tubes with a liquid oscillating in the latter on said base-plate, the level of said liquid oscillating around a fixed center of the indicator for right and left hand turns of the vehicle, a dial on said base-plate having two adjustable danger-hands and a pair of non-variable scales, an electric battery or its equivalent, and an alarm bell, the wire of one pole of said battery entering at a lower place inside of said communicating glass tubes and being constantly connected with the oscillating liquid in said tubes, the other pole of said battery is connected with said alarm bell, from the latter two wires branching off, one of them being connected to an adjustable rod on the right, and the other to an adjustable rod on the left, said rods entering the upper ends of said communicating glass tubes and coming in touch with the oscillating liquid in said tubes when the side-force acting on the turning vehicle is reaching the lower limit of the danger zone, the rod on the left, by a right hand turn, and the rod on the right, by a left hand turn of the vehicle, thereby closing the electric circuit to ring said alarm bell, said two rods being adjusted according to the load of the vehicle, the positions of said danger-hands on said dial having a fixed relation to the position of the center of gravity of the loaded vehicle, the plane of said communicating glass tubes with their zero-line being near and normal to the center line of the vehicle, the level of said oscillating liquid acting as an index-hand on said scales, and showing thereby on the latter when the vehicle is moving in a curve on a level or banked road, indirectly the side-force acting on the turning vehicle, and the increased danger of the latter being turned over, when first, said alarm bell commences to ring, and then when the level of said oscillating liquid comes more or less close to one of said two danger-hands.

2. In a double acting side-force and danger indicator for vehicles, the combination of a base-plate, straight or curved communicating glass tubes with a liquid oscillating in the latter on said base-plate, the level of said liquid oscillating around a fixed center of the indicator for right and left hand turns of the vehicle, a dial on said base-plate having two danger-marks, and a pair of side-force scales, an electric battery or its equivalent, and two electric alarm bells of different sounds, the wire of one battery pole entering at a lower place inside of said communicating glass tubes and being constantly in touch with the oscillating liquid in said tubes, the other pole of said battery is connected with said two alarm bells in parallel, from each of the latter a pair of wires branch off, one wire of each pair going to the right, and the other wire of each pair going to the left, two wires of said four branches entering at fixed places at the right, and the other two wires entering at fixed places at the left, of said communicating tubes, the wire pair of one alarm bell coming in touch with said oscillating liquid by a right or left hand turn when the side-force acting on the turning vehicle reaches a fixed point below the lower limit of the danger zone, thereby closing the circuit, and said one alarm bell is ringing, the wire pair of the other alarm bell coming in touch with said oscillating liquid by a right or left hand turn, when the side-force reaches the lower limit of the danger zone, thereby closing the circuit branch operating the other alarm bell, and both alarm bells are now ringing, the positions of said danger-marks on said dial having a fixed relation to the position of the center of gravity of the loaded vehicle, the plane of said communicating glass tubes with their zero-line being near and normal to the center line of the vehicle, the level of said oscillating liquid acting as an index-hand on said pair of side-force scales, and showing thereby on the latter when the vehicle is moving in a curve on a level or banked road, the side-force acting on the turning vehicle, and by ringing of the first alarm bell indicating that a certain lower side-force is reached, and the increased danger of the vehicle being turned over is indicated when first, both alarm bells are ringing, and then when the level of said oscillating liquid comes more or less close to one of said two danger-marks.

3. In a double acting side-force and danger-indicator for vehicles, the combination of a base-plate, two or more straight communicating glass tubes with a liquid oscillating in them on said base-plate, the level of said liquid oscillating around a fixed center of the indicator for right and left hand turns of the vehicle, a dial on said base-plate having two adjustable danger-hands, and a pair of non-variable scales, an electric battery or its equivalent, and two electric alarm bells of different sounds, the wire of one battery pole entering at a lower place inside of said communicating glass tubes and being constantly in touch with the oscillating liquid in said tubes, the other pole of said battery is connected with said two alarm bells in parallel, from each of the latter a pair of wires branch off, one wire of each pair going to the right, and the other wire of each pair going to the left, two wires of said four branches being connected each one to an adjustable rod on the right, and the other two wires being connected each one to an adjustable rod on the left, said four rods enter the upper ends of said communicating glass tubes, the two rods connected to one alarm bell coming in touch with the oscillating liquid in said tubes, by a right respective left hand turn of the vehicle, when the side-force acting on the vehicle reaches a fixed point below the lower limit of the danger zone, thereby closing the circuit and said one alarm bell is ringing, the two rods connected to the other alarm bell coming in touch with said oscillating liquid by a right respective left hand turn, when the side-force reaches the lower limit of the danger zone, thereby closing the circuit branch operating said other alarm bell, and both alarm bells are now ringing, said four rods being adjusted according to the load of the vehicle, the positions of said two danger-hands on said dial having a fixed relation to the position of the center of gravity of the loaded vehicle, the plane of said communicating glass tubes with their zero-line being near and normal to the center line of the vehicle, the level of said oscillating liquid acting as an index-hand on said pair of scales, and showing thereby on the latter when the vehicle is moving in a curve on a level or banked road, indirectly the side-force acting on the turning vehicle, and by ringing of the first alarm bell indicating, that a certain lower side-force is reached, and the increased danger of the vehicle being turned over is indicated when first, both alarm bells are ringing, and then when the level of said oscillating liquid comes more or less close to one of said two danger-hands.

4. In a double acting side-force and danger indicator for vehicles, the combination of a base-plate, straight or curved communicating glass tubes with a liquid oscillating in them on said base-plate, the level of said liquid oscillating around a fixed center of the indicator for right and left hand turns of the vehicle, a dial on said base-plate having a plurality of pairs of side-force scales, corresponding to a plurality of different loads of the vehicle, the two $100_s$ marks of each pair of scales are the two acting danger-marks on the dial, when said pair of scales is acting for a certain load of the vehicle, an electric battery or its equivalent, and an electric alarm bell, the wire of one pole of said battery being connected with said alarm bell, and then the current wire entering at a lower place inside of said communicating glass tubes and being constantly connected with the oscillating liquid in said tubes, the other pole of said battery is connected with a switch, which directs the current to one of a plurality of pairs of wire branches, each pair corresponding to a certain vehicle load, one half of said two wire branches entering at fixed places at the right, and the other half at fixed places at the left of said communicating glass tubes, and coming in touch with said oscillating liquid, by a right respective left hand turn of the vehicle, when the side-force acting on the turning vehicle reaches the lower limit of the danger zone, thereby closing the electric circuit and said alarm bell is ringing, the positions of the two acting danger-marks on the dial having a fixed relation to the position of the center of gravity of the corresponding load of the vehicle, the plane of said communicating glass tubes with their zero-line being near and normal to the center line of the vehicle, the level of said oscillating liquid acting as an index-hand on said scales, and showing thereby on said acting pair of side-force scales when the vehicle is moving in a curve on a level or banked road, the side-force acting on the turning vehicle, and the increased danger of the latter being turned over, when first, said alarm bell commences to ring, and then, when the level of said oscillating liquid comes more or less close to one of said two acting danger-marks.

In testimony that I claim the foregoing as my invention, I have signed my name in presence of two subscribing witnesses.

MATHIAS J. KLEIN.

Witnesses:
D. LEWIS MATTERN,
M. MOE WEINBERG.